United States Patent [19]
Kagebeck

[11] Patent Number: 5,559,556
[45] Date of Patent: Sep. 24, 1996

[54] APPARATUS FOR CONNECTING AN IMAGE SENSOR AND AN OPTICAL UNIT TO A CIRCUIT BOARD SO THAT THEY ARE PROPERLY ALIGNED

[75] Inventor: Tor Kagebeck, Linköping, Sweden

[73] Assignee: ICL Systems AB, Kista, Sweden

[21] Appl. No.: 367,238

[22] PCT Filed: Jun. 15, 1993

[86] PCT No.: PCT/SE93/00529

§ 371 Date: Jan. 9, 1995

§ 102(e) Date: Jan. 9, 1995

[87] PCT Pub. No.: WO94/00883

PCT Pub. Date: Jan. 6, 1994

[30] Foreign Application Priority Data

Jun. 30, 1992 [SE] Sweden ................................ 9202016.3

[51] Int. Cl.$^6$ ................................................ H04N 5/225
[52] U.S. Cl. ............................................. 348/374; 348/335
[58] Field of Search ............................... 348/374, 373, 348/335; 359/819, 811; 250/578.1, 208.1; H04N 5/225

[56] References Cited

U.S. PATENT DOCUMENTS 4,594,613  6/1986  Shinbori et al. ................. 348/374 X
4,803,557  2/1989  Bridges .............................. 348/374
5,153,734  10/1992  Kanamon et al. .............. 348/374 X
5,274,456  12/1993  Izumi et al. ....................... 348/335
5,444,485  8/1995  Uchioke et al. ................... 348/335

Primary Examiner—Wendy Garber
Attorney, Agent, or Firm—Lee, Mann, Smith, McWilliams, Sweeney & Ohlson

[57] ABSTRACT

An arrangement for an image scanning unit (1) includes a semiconductor package (2) so arranged as to generate electrical signals corresponding to an image incident upon the light-sensitive surface (2a) of the package and so arranged as to be connected to a circuit (5) by soldering its contact legs (2b) to the circuit board (5). Also present are an optical system arranged in a holder (3) for projecting the image to be scanned onto the aforementioned light-sensitive surface (2a) and a mounting plate (4) positioned between the semiconductor package (2) and the circuit board (5). Finally, devices (3a, 3b, 4a) are also present for joining together the holder (3) and the mounting plate (4) and for ensuring correct mutual alignment between the semiconductor package (2) and the optical system.

4 Claims, 3 Drawing Sheets

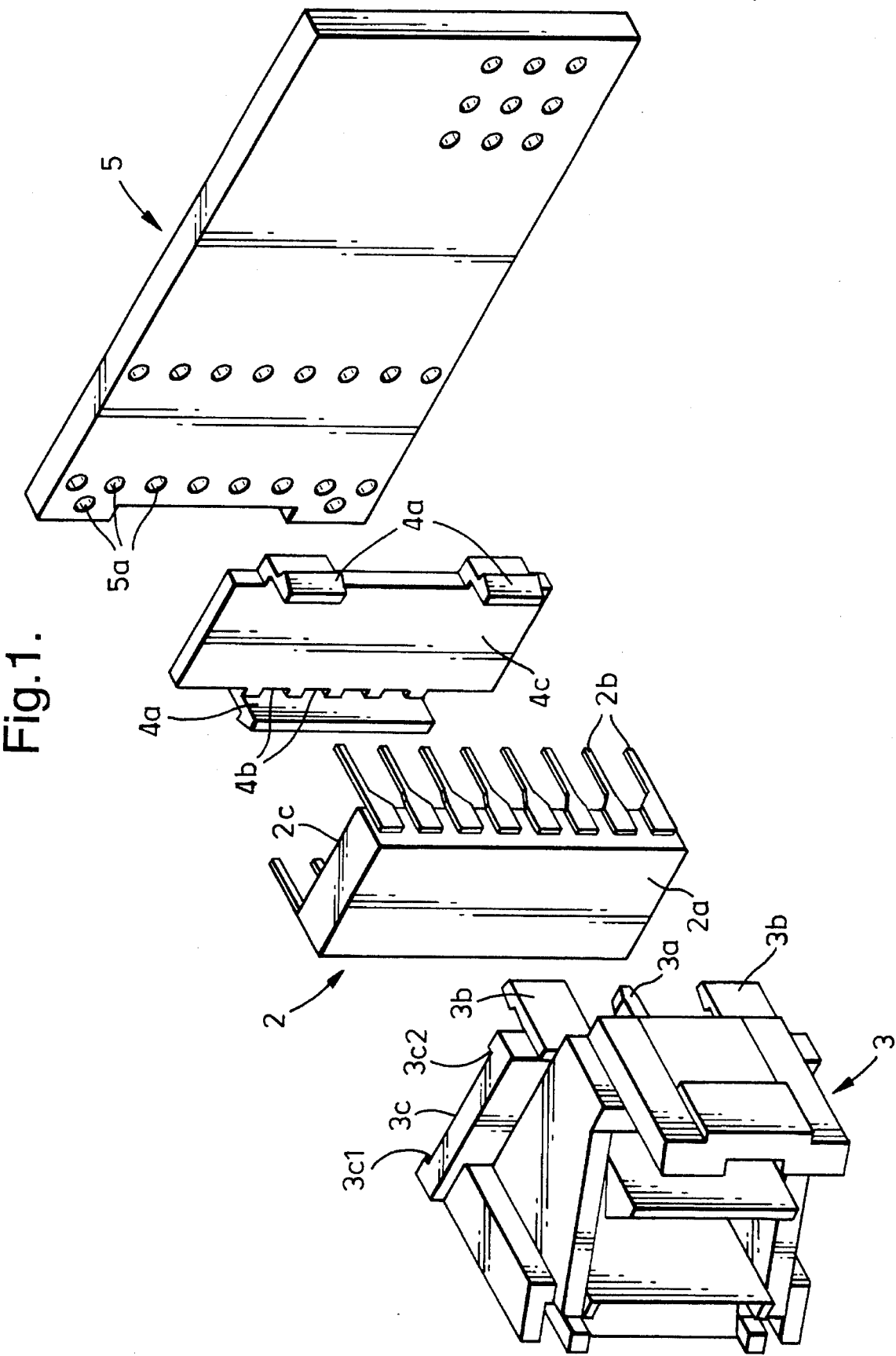

APPARATUS FOR CONNECTING AN IMAGE SENSOR AND AN OPTICAL UNIT TO A CIRCUIT BOARD SO THAT THEY ARE PROPERLY ALIGNED

BACKGROUND OF THE INVENTION

1. Field of the Invention

The present invention relates to an arrangement for am image scanning unit comprising a semiconductor package so arranged as to generate electrical signals corresponding to an image incident upon the light-sensitive surface of the package and so arranged as to be connected by soldering to a circuit board, an optical system arranged in a holder for projecting the image to be scanned onto the aforementioned light-sensitive surface, a mounting plate positioned between the semiconductor package and the circuit board, and devices for joining together the holder and the mounting plate and for ensuring correct mutual alignment between the semiconductor package and the optical system.

2. Description of the Related Art

An arrangement of this kind is previously disclosed through U.S. Pat. No. 4,594,613. The mounting plate is attached in this case to the holder for the optical system by means of screws and pins, which project outwards from the holder and interact with holes in the mounting plate in order to ensure the desired alignment between the semiconductor package and the optical system. The previously disclosed arrangement has a comparatively bulky construction and uses many detail components which demand a relatively long assembly time; in order to be able to fix the holder to the mounting plate with screws, or vice versa, openings are also required in the actual circuit board. Ensuring that the holder is correctly aligned relative to the semiconductor package, as briefly described above, means that the accuracy of the alignment may be jeopardized.

SUMMARY OF THE INVENTION

The object of the present invention is to make available an arrangement of the kind referred to by way of introduction, in which elimination of the above-mentioned disadvantages has been effected and has been made possible in that in order to ensure correct alignment between the optical system and the light-sensitive surface of the semiconductor package in the longitudinal direction of the semiconductor package, the aforementioned devices comprise a projection projecting from the holder in such a way, when the unit is assembled, that it engages between two of the contact legs of the semiconductor package, and that for ensuring correct alignment in the transverse direction of the semiconductor package and in a direction normal to the light-sensitive surface, the aforementioned joining devices comprise snap elements capable of interacting with one another arranged on the holder and on the mounting plate.

A desired alignment accuracy tolerance between the optical system and the light-sensitive surface of the semiconductor package is achieved through the characteristic features of the invention in that the location of the holder is achieved by means of the semiconductor package itself or, rather, with two of its contact legs. In addition, a space-saving, rapid, reliable and simple joint is obtained between the holder and the mounting plate.

In accordance with one particular characteristic of the invention, the snap elements in one preferred embodiment are arranged along two lines running parallel to one another and to the longitudinal edges of the semiconductor package and lying in areas close to them.

BRIEF DESCRIPTION OF THE DRAWING

The invention is described in greater detail below with reference to the accompanying drawing, in which FIG. 1 illustrates an exploded view of the invention in perspective view.

DESCRIPTION OF THE PREFERRED EMBODIMENT

Figure 2A:
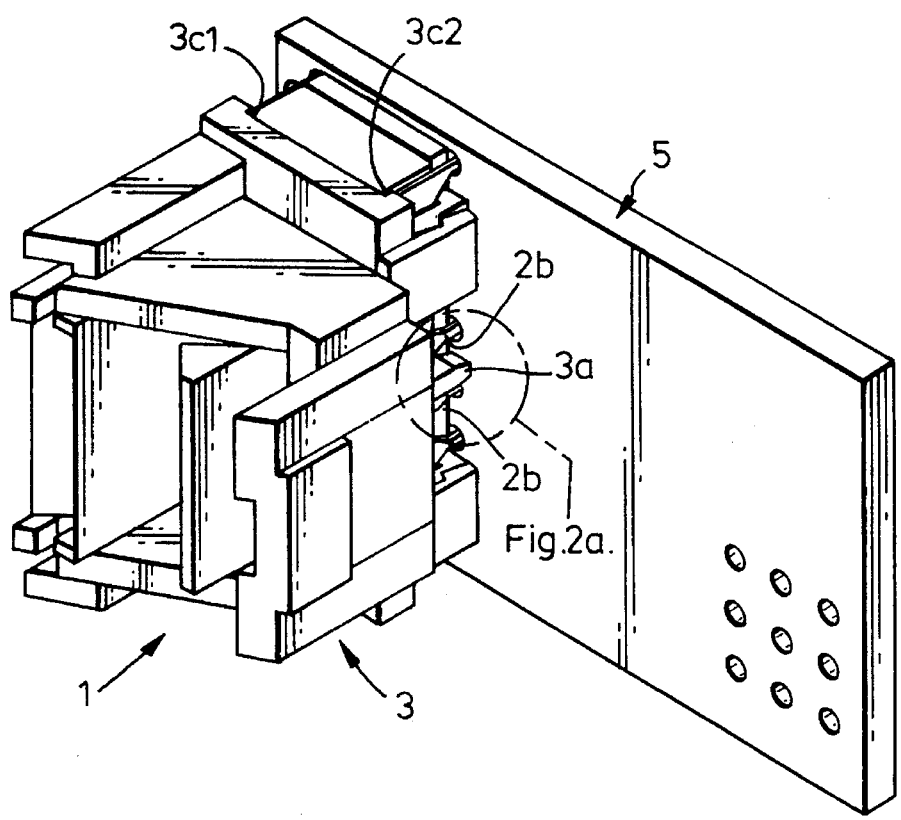
FIG. 2a shows the arrangement in accordance with the invention installed.
Figure 2B:
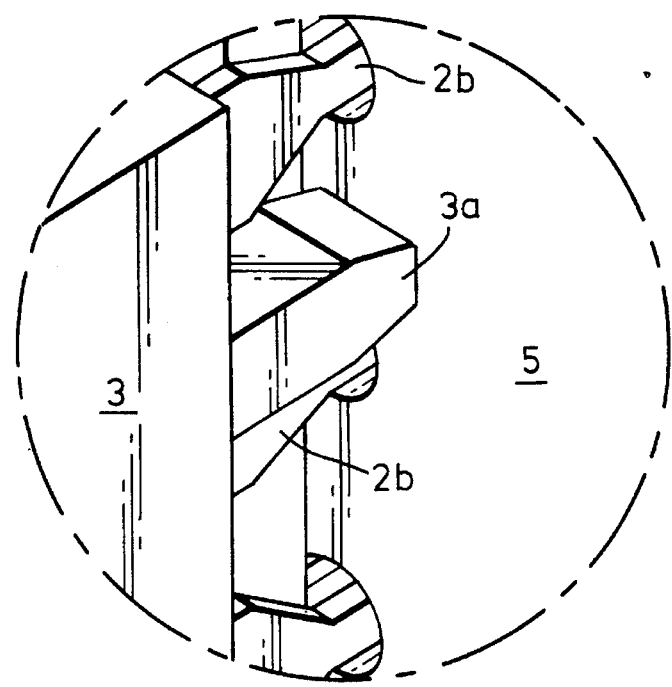
FIG. 2b is a detailed view showing a projection which ensures correct alignment between the light-sensitive surface of a semiconductor package and an optical system, by means of which an image is projected onto the aforementioned surface.

The designation 1 is used in the drawing generally for an image scanning unit comprising a semiconductor package 2 with a light-sensitive surface 2a, a holder 3 for an optical system (not shown in the drawing) for projecting onto the light-sensitive surface 2a an image which is to be scanned, a mounting plate 4 and a circuit board 5.

The semiconductor package has contact legs 2b which carry electrical signals corresponding to the image incident upon the light-sensitive surface 2a when the image scanning unit is being used, and which are intended to be connected in the conventional manner to a conductive pattern on the circuit board 5. The contact legs 2b are inserted for this purpose into holes 5a in the circuit board 5 and are soldered in place to the conductive pattern. The mounting plate 4 is so arranged as to be positioned between the semiconductor package 2 and the circuit board 5 in the space which is conventionally present between a circuit board and a semiconductor package of this kind when it is soldered in place on the circuit board.

Figure 3A:
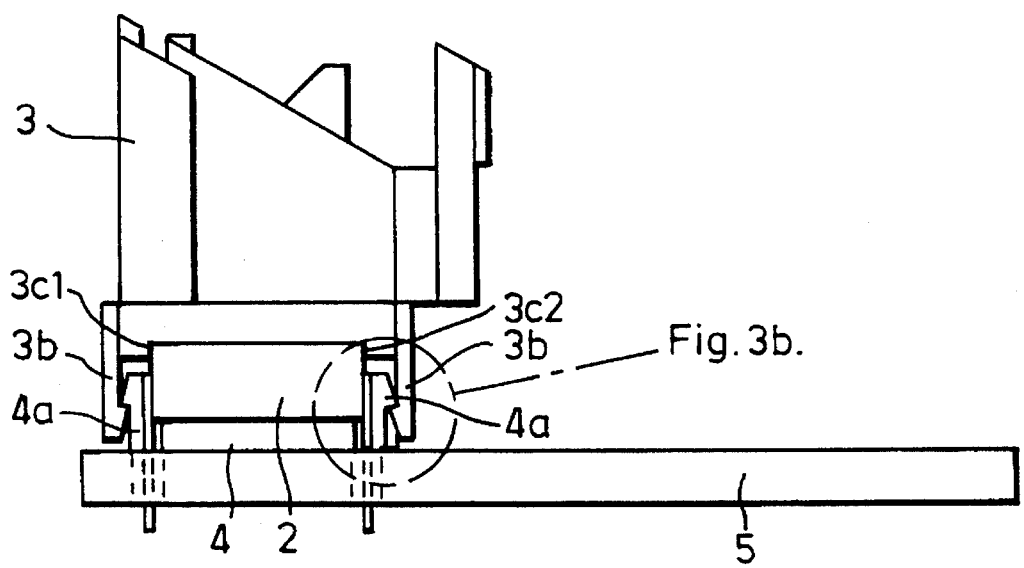
FIG. 3a shows the arrangement in accordance with the invention shown in FIG. 2a in side view.
Figure 3B:
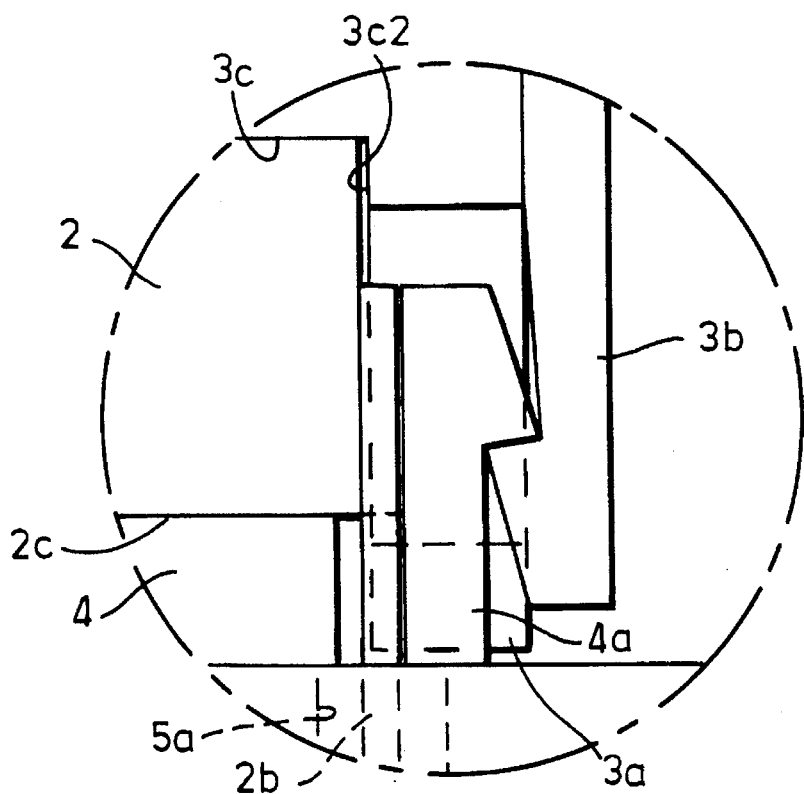
FIG. 3b is an enlarged partial view of FIG. 3a, which shows snap elements by means of which a holder for the optical system is fixed to a mounting plate for the holder.

Rapid and reliable joining of the holder 3 to the mounting plate and, at the same time, accurate alignment of the optical system relative to the light-sensitive surface 2a in the transverse direction of the semiconductor package 2 and in a direction normal to the surface 2a are achieved in accordance with the invention by means of snap elements 3b, 4a interacting with one another arranged on the holder 3 and on the mounting plate 4 and preferably integral with them. The manner in which these snap elements 3b, 4a interact can be appreciated most clearly from FIGS. 3a, 3b.

The holder 3 exhibits on its surface facing the semiconductor package 2 a recess 3c into which the semiconductor package 2 fits. When the package 2 is introduced into the recess 3c and rests against its bottom, the edges 3c1, 3c2 of the recess 3c form guide edges for the longitudinal edges of the semiconductor package 2. When the arrangement is installed, the internal surfaces of the snap elements 4a belonging to the mounting plate 4 and facing towards the contact legs 2b also touch corresponding contact legs 2b. Very stable and reliable alignment is thus achieved between the component parts of the arrangement.

An image scanning unit 1 in accordance with the invention is installed as follows: first the semiconductor package 2 is attached to the mounting plate 4, in conjunction with which a number of the contact legs 2b of the semiconductor package 2, more specifically those which are situated in association with the snap elements 4a, are caused to pass through transcurrent holes 4b in the mounting plate 4. The rear surface 2c of the semiconductor package 2 facing away from the light-sensitive surface 2a now comes into contact with the top surface 4c of the mounting plate. The semiconductor package 2 together with the mounting plate 4 is then assembled with the circuit board 5, whereupon the contact legs 2b are soldered in place on the circuit board 5 in the conventional manner.

The holder 3 can now be installed. It is essential to make sure that the projection 3a is introduced between two selected contact legs 2b at the same time as the snap elements 3b, 4a are brought into engagement with one another. Once this has occurred, an edge area of the light-sensitive surface 2a will lie against a surface (not shown in the drawing) corresponding to the underside of the holder 3. Direct and accurate alignment of the holder, and thus of the optical system arranged in the holder, relative to the light-sensitive surface is achieved in this way.

I claim:

1. An arrangement for an image scanning unit comprising:
    a semiconductor package, so arranged as to generate electrical signals corresponding to an image incident upon a light-sensitive surface of the package, and so arranged as to be connected to a circuit board by soldering its contact legs to the circuit board, the semiconductor package extending generally in a first, longitudinal, direction and a second, transverse, direction, and the light-sensitive surface extending in said longitudinal and transverse directions;
    an optical system arranged in a holder for projecting the image to be scanned onto the light-sensitive surface;
    a mounting plate positioned between the semiconductor package and the circuit board, and
    devices for joining together the holder and the mounting plate and ensuring correct mutual alignment between the semiconductor package and the optical system;
    wherein, for ensuring correct alignment between the optical system and the light-sensitive surface of the semiconductor package in the longitudinal direction of the semiconductor package, said joining devices comprise a projection projecting from the holder in such a way that, when the unit is assembled, it engages between two of the contact legs of the semiconductor package;
    and wherein, for ensuring correct alignment in the transverse direction of the semiconductor package and in a direction normal to the light-sensitive surface, said joining devices comprise snap elements, capable of interacting with one another, arranged on the holder and on the mounting plate.

2. An arrangement as claimed in claim 1, wherein the holder exhibits, on its surface facing the semiconductor package, a recess into which the package fits, the edges of which recess form guide edges for edges of the semiconductor package extending in the longitudinal direction.

3. An arrangement as claimed in claim 1, wherein the holder exhibits, on its surface towards the semiconductor package, a recess into which the package fits, the edges of which recess form guide edges for the longitudinal edges of the semiconductor package.

4. An arrangement as claimed in claim 1, wherein the surfaces of the snap elements arranged on the mounting plate and facing towards the contact legs also touch corresponding contact legs.

* * * * *